(12) United States Patent
Shimizu et al.

(10) Patent No.: US 11,837,120 B2
(45) Date of Patent: Dec. 5, 2023

(54) DISPLAY DEVICE AND METHOD OF CONTROLLING DISPLAY DEVICE

(71) Applicant: SEIKO EPSON CORPORATION, Tokyo (JP)

(72) Inventors: Hiroaki Shimizu, Shimosuwa-machi (JP); Tatsuya Yanagisawa, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/838,256

(22) Filed: Jun. 12, 2022

(65) Prior Publication Data

US 2022/0398951 A1 Dec. 15, 2022

(30) Foreign Application Priority Data

Jun. 14, 2021 (JP) ................. 2021-098577

(51) Int. Cl.
  *G09G 3/00* (2006.01)
  *G09G 3/36* (2006.01)
  *G03B 21/00* (2006.01)

(52) U.S. Cl.
  CPC ........... *G09G 3/001* (2013.01); *G03B 21/006* (2013.01); *G09G 3/3611* (2013.01); *G09G 2330/12* (2013.01); *G09G 2360/145* (2013.01)

(58) Field of Classification Search
  CPC . G09G 3/001; G09G 3/3611; G09G 2360/145
  See application file for complete search history.

(56) References Cited

U.S. PATENT DOCUMENTS

| | | | | |
|---|---|---|---|---|
| 5,621,334 A | * | 4/1997 | Urano | G09G 3/006 324/760.01 |
| 6,054,870 A | * | 4/2000 | Urano | G09G 3/006 324/758.02 |
| 7,242,384 B2 | * | 7/2007 | Yamamoto | G09G 3/3406 345/55 |
| 7,468,721 B2 | * | 12/2008 | Nakano | G06F 3/042 345/697 |
| 8,736,581 B2 | * | 5/2014 | Han | G06F 3/0412 250/221 |

(Continued)

FOREIGN PATENT DOCUMENTS

| | | |
|---|---|---|
| JP | 2008-040016 | 2/2008 |
| JP | 2010-117463 | 5/2010 |
| JP | 2010-152061 | 7/2010 |

*Primary Examiner* — Gene W Lee
(74) *Attorney, Agent, or Firm* — JCIPRNET

(57) ABSTRACT

In a display device, when blue (B) light enters a first liquid crystal panel, radiated light radiated from the first liquid crystal panel contains red (R) phosphorescence having a wavelength range longer than blue (B) light due to a deterioration of a liquid crystal material. Thus, in the display device, an optical sensor device is provided behind a mirror comprised of a dichroic mirror to monitor or the like the service life of the first liquid crystal panel on the basis of a result of reception, at the optical sensor device, of light having a frequency band ranging from 600 nm to 650 nm, and makes notification of the result. Furthermore, on the basis of a result from the optical sensor device, an electrode used to suck impurities provided at the first liquid crystal panel is driven to sweep ionic impurities from a display region.

16 Claims, 12 Drawing Sheets

(56) References Cited

U.S. PATENT DOCUMENTS

| | | | |
|---|---|---|---|
| 9,423,615 B2* | 8/2016 | Sato | G02B 27/01 |
| 10,614,283 B2* | 4/2020 | He | G06F 21/32 |
| 10,966,643 B1* | 4/2021 | Vavadi | A61B 5/4845 |
| 11,129,226 B2* | 9/2021 | Boccon-Gibod | H04W 84/20 |
| 11,178,261 B1* | 11/2021 | Boccon-Gibod | H04W 76/23 |
| 11,277,878 B2* | 3/2022 | Boccon-Gibod | H04W 72/04 |
| 2010/0128004 A1* | 5/2010 | Harada | G06F 3/0412 |
| | | | 348/311 |

* cited by examiner

DISPLAY DEVICE AND METHOD OF CONTROLLING DISPLAY DEVICE

The present application is based on, and claims priority from JP Application Serial Number 2021-098577, filed on Jun. 14, 2021, the disclosure of which is hereby incorporated by reference herein in its entirety.

BACKGROUND

1. Technical Field

The present disclosure relates to a display device including a liquid crystal panel and a method of controlling the display device.

2. Related Art

In a projection-type display device, light output from a light source unit is emitted to a transmissive-type liquid crystal panel or a reflection-type liquid crystal panel, and transmitted light or reflected light that has been modulated by the liquid crystal panel is projected on a screen. In a case of such a display device, the display device is more likely to deteriorate, for example, due to the high-intensity light output from the light source unit to the liquid crystal panel. In this respect, there is proposed a technique in which an optical sensor is provided in the display device to, for example, change driving conditions of the display device on the basis of a detection result from the optical sensor (JP-A-2008-40016).

In the technique described in JP-A-2008-40016, the optical sensor detects the chromaticity or illuminance of the light that has been modulated by the liquid crystal panel, and on the basis of a result of the detection, the quality of an image is determined to control a cooling fan. However, the technique described in JP-A-2008-40016 has a problem in that this technique is not able to detect whether the deterioration is caused by the liquid crystal panel or the light source unit, and it is difficult to appropriately monitor the deterioration of the liquid crystal panel.

SUMMARY

In order to solve the problem described above, an aspect of a liquid crystal device according to the present disclosure includes a first liquid crystal panel, and an optical sensor device configured to detect radiated light that is radiated from the first liquid crystal panel when light having a first wavelength range enters the first liquid crystal panel, the radiated light having a wavelength range that is longer than the first wavelength range.

In the present disclosure, one aspect of a method of controlling a display device including a liquid crystal panel includes causing light having a first wavelength range to enter the liquid crystal panel, and detecting radiated light that is radiated from the liquid crystal panel and has a wavelength range that is longer than the first wavelength range.

DESCRIPTION OF EXEMPLARY EMBODIMENTS

Figure 1:
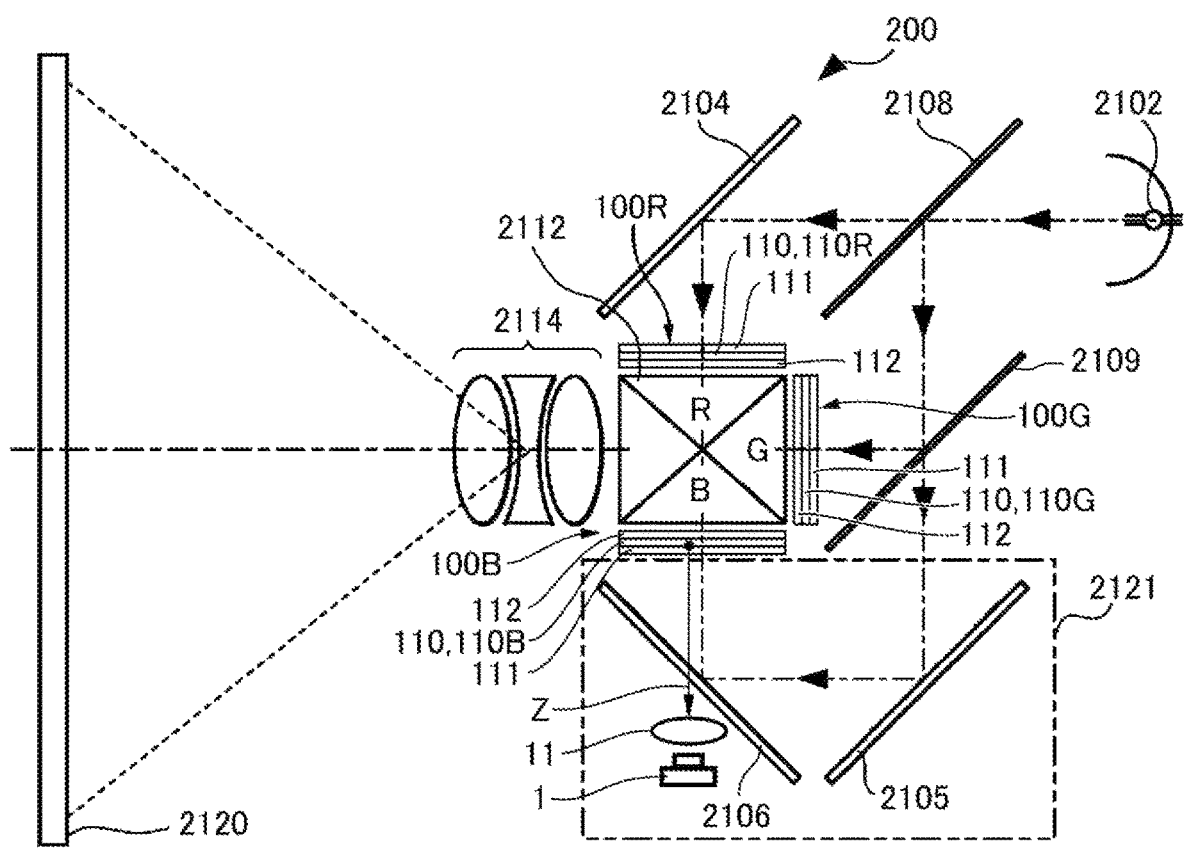
FIG. 1 is an explanatory diagram of a projection-type display device according to a first embodiment of the present disclosure.

Embodiments according to the present disclosure will be described with reference to the drawings. Note that, in each of the drawings used in the following description, each layer and each member are illustrated at different scales in order to illustrate each layer and each member in a recognizable size in the drawings. Note that, in the following description, a liquid crystal panel is denoted as the reference character 110, and corresponding colors are denoted as the reference characters R, G, and B. However, when corresponding colors do not need to be specified, description will be made simply by mentioning it as a liquid crystal panel 110.

1. First Embodiment 1-1. Projection-Type Display Device

Figure 2:
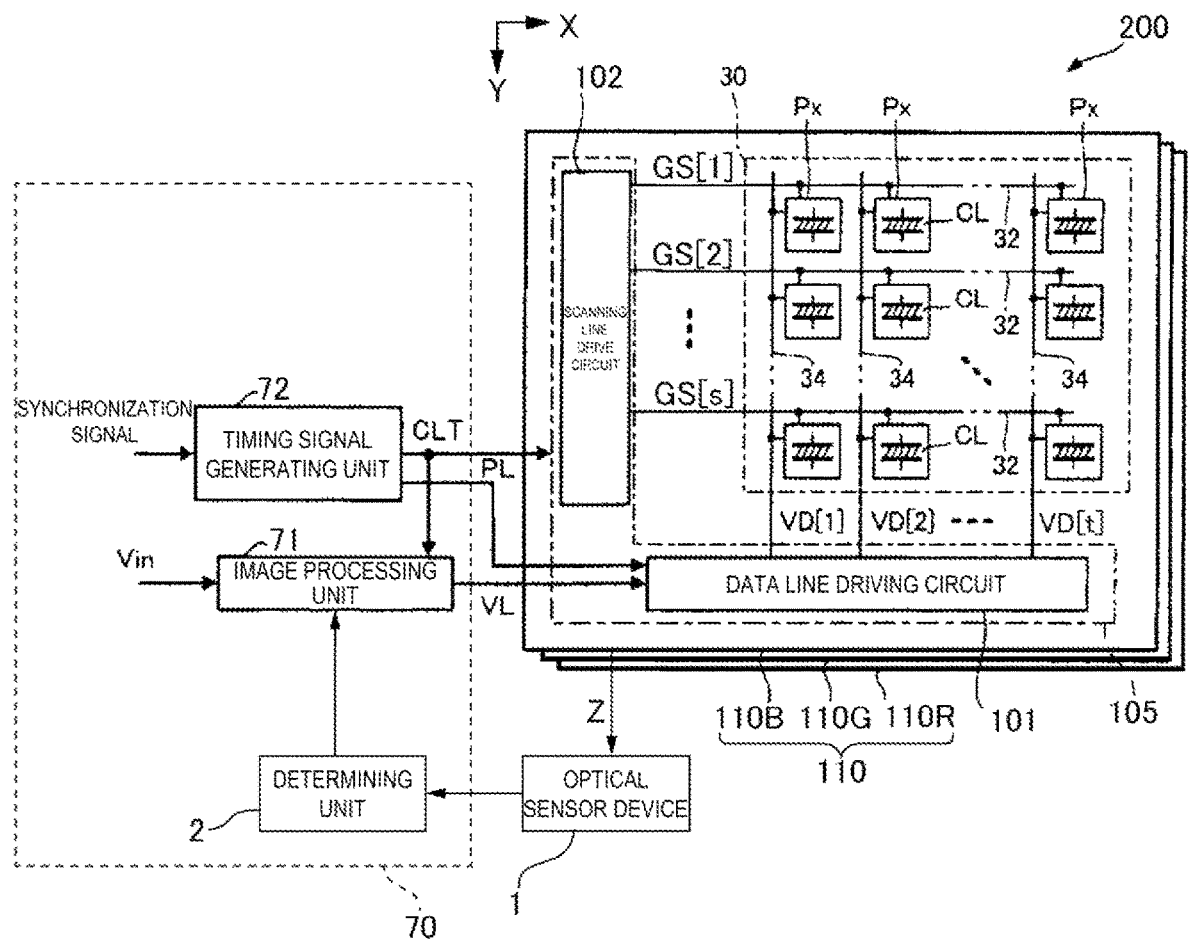
FIG. 2 is an explanatory diagram of a control system of the projection-type display device illustrated in FIG. 1.

FIG. 1 is an explanatory diagram of a projection-type display device 200 according to a first embodiment of the present disclosure. FIG. 2 is an explanatory diagram of a control system of of the projection-type display device 200 illustrated in FIG. 1.

The projection-type display device 200 illustrated in FIG. 1 includes a white light source unit 2102 comprised, for example, of a lamp unit including a halogen lamp and an array light source including a semiconductor layer. The light source light output from the white light source unit 2102 is split into three primary colors of red (R), green (G), and blue (B) using three mirrors 2104, 2105, and 2106 and two dichroic mirrors 2108 and 2109, which are provided inside.

The split projection lights are each guided to each of light valves 100R, 100G, and 100B corresponding to red (R), green (G), and blue (B), respectively, and are modulated. Note that, in FIG. 1, the optical path for the blue (B) light extends longer than that for the red (R) light or the green (G) light. Thus, in order to prevent a loss resulting therefrom, the blue (B) light is guided through a blue (B) optical system 2121 including a relay lens, which is not illustrated.

The light valve 100R, 100G, 100B includes an incidence-side polarization separation element 111 and an output-side polarization separation element 112 each provided at both sides of a liquid crystal panel 110. Here, the wavelengths of the red (R), green (G), and blue (B) lights have the following relationship.

B<G<R

Thus, the display device 200 includes, as the liquid crystal panel 110, a first liquid crystal panel where light having a first wavelength range enters, a second liquid crystal panel where light having a second wavelength range differing from the first wavelength range enters, and a third liquid crystal panel where light having a third wavelength range having a wavelength longer than the first wavelength range and the second wavelength range. Here, on the assumption that the first wavelength range is a wavelength range that is lower than the second wavelength range, light having each wavelength and the liquid crystal panel 110 are defined in the following manner.

Light having a first wavelength range=blue (B) light
Light having a second wavelength range=green (G) light
Light having a third wavelength range=red (R) light
Light crystal panel 110 where blue (B) light enters=first liquid crystal panel 110B
Light crystal panel 110 where green (G) light enters=second liquid crystal panel 110G
Light crystal panel 110 where red (R) light enters=third liquid crystal panel 110R

Light that has been modulated by each of the light valves 100R, 100G, and 100B enters a synthesis optical system 2112 comprised of dichroic prisms from three directions. Then, the red light and the blue light are reflected at 90 degrees at the synthesis optical system 2112 whereas the green light passes through the synthesis optical system 2112. Thus, after images of the individual primary colors are combined, a color image is projected onto a projection target member 2120 such as a screen by using a projection optical system 2114.

In addition, the display device 200 includes an optical sensor device 1 provided at a light incident side of the liquid crystal panel 110. The optical sensor device 1 detects light having a wavelength range differing from light that enters the liquid crystal panel 110. As described later, the optical sensor device 1 detects radiated light Z that is radiated from the liquid crystal panel 110 when light enters the liquid crystal panel 110. This radiated light Z is photoluminescence of liquid crystal of the liquid crystal panel 110, and differs from light that enters the liquid crystal panel 110.

The optical sensor device 1 according to the present embodiment is disposed at a side opposite from the first liquid crystal crystal panel 110B relative to the mirror 2106 that guides, to the first liquid crystal panel 110B, blue light that is light having a first wavelength range, and detects radiated light Z having a wavelength range differing from the first wavelength range. The optical sensor device 1 detects radiated light Z that is radiated from the first liquid crystal panel 110B when light having a first wavelength range enters the first liquid crystal panel 110B. The mirror 2106 reflects light of blue B that is light having a first wavelength range, and allows light having other wavelength ranges to pass through. Thus, the optical sensor device 1 is able to detect, through the mirror 2106, the radiated light Z that is radiated from a surface of the first liquid crystal panel 110B at a light incidence side.

The optical sensor device 1 employs a camera or a spectroscopy unit. The optical sensor device 1 according to the present embodiment employs a mode in which a filter or the like is used to limit the wavelength of incident light to the photoreceptor element to fall in a range of 600 nm to 650 nm. In addition, the optical sensor device 1 may employ a mode in which, on the basis of a result of reception of light by a photoreceptor element, the intensity of light having a frequency band of 600 nm to 650 nm is extracted. Furthermore, for the optical sensor device 1, it may be possible to provide a condensing lens 11 between the mirror 2106 and the optical sensor device 1 in order to enhance the sensitivity.

The display device 200 according to the present embodiment has a configuration in which, with the dichroic mirror 2109, neither red light nor green light enters an optical system from the dichroic mirror 2109 to the first liquid crystal panel 110B. When the optical sensor device 1 configured to monitor the first liquid crystal panel 110B detects a change in light having a color differing from blue light, it is assumed that a change happens in the first liquid crystal panel 110B. Furthermore, the display device 200 has a configuration in which, with the dichroic mirror 2108, red light does not enter an optical system from the dichroic mirror 2108 to the second liquid crystal panel 110G. In addition, the display device 200 has a configuration in which, with the dichroic mirror 2108, neither blue light nor green light does not enter an optical system from the dichroic mirror 2108 to the third liquid crystal panel 110R. Thus, the optical sensor device 1 may be disposed at an opposite side, of the dichroic mirror 2109, from the second liquid crystal panel 110G and be configured to monitor light differing from green light and blue light. Furthermore, the optical sensor device 1 may be disposed at an opposite side, of the mirror 2104, from the third liquid crystal panel 110R and be configured to monitor light differing from red light.

As illustrated in FIG. 2, the projection-type display device 200 includes three liquid crystal panels 110 comprised of the first liquid crystal panel 110B, the second liquid crystal panel 110G, and the third liquid crystal panel 110R, and also includes a control unit 70. The liquid crystal panel 110 includes a pixel area E in which a plurality of pixels P are arrayed, and a driving circuit 105 configured to drive the plurality of pixels P. The pixel area E of the liquid crystal panel 110 includes s pieces of scanning lines 32 extending in a first direction X and t pieces of data lines 34 extending in a second direction Y. Each of "s" and "t" is an integer equal to or more than 2. The plurality of pixels P are arrayed in s rows (vertical direction)×t column (width direction) so as to correspond to intersections between scanning lines 32 and data lines 34. The plurality of pixels P each include a liquid crystal element CL. In addition, although illustration is not given, the plurality of pixels P each include a pixel switching element and a storage capacitor.

The driving circuit 105 includes a data line driving circuit circuit 101 and a scanning line drive circuit 102, and is configured to supply each of the plurality of pixels P with image signals VD [j] that each designate a gray scale level that each of the plurality of pixels P displays. The "j" is an integer that meets $1 \leq j \leq t$. The scanning line drive circuit 102 supplies a scanning signal GS [i] to a scanning line 32 at the i-th row. The "i" is an integer that meets 1≤i≤s. The data line driving circuit 101 supplies image signals VD [1] to VD [t] to the first to t-th rows of data lines 34 in synchronization with selection of scanning lines 32 by the scanning scanning line drive circuit 102. The liquid crystal element CL is driven with a voltage corresponding to the image signal VD[j] to modulate light in accordance with an electro-optic property (V-T property) (see FIG. 8).

The control unit 70 includes an image processing unit 71, a timing signal generating unit 72, and a determining unit 2. On the basis of a synchronization signal supplied from an upper-layer device (not illustrated), the timing signal generating unit 72 generates a control signal CLT used to control the driving circuit 105 and the image processing unit 71. The timing signal generating unit 72 supplies the generated control signal CLT to the driving circuit 105 and the image processing unit 71. The timing signal generating unit 72 generates a polarity signal PL that defines a polarity of the image signal VD[n], and supplies it to the data line driving circuit 101. The data line driving circuit 101 sets the polarity of the image signal VD [n] in accordance with the polarity signal PL. Once an input video signal Vin indicating an image to be displayed by the display device 200 is supplied from the upper-layer device, the image processing unit 71 generates a gray-scale signal VL indicating a gray scale level of a pixel P on the basis of the input video signal Vin and the control signal CLT, and outputs it to the data line driving circuit 101. The determining unit 2 determines whether or not the intensity of the radiated light Z exceeds a predetermined value, on the basis of information from the optical sensor device 1. The image processing unit 71, the timing signal generating unit 72, and the determining unit 2 are achieved with electronic circuits. The control unit 70 is configured as a processor. The image processing unit 71, the timing signal generating unit 72, and the determining unit 2 may be configured as a module implemented by the processor.

1-2. Overall Configuration of Liquid Crystal Panel 110

Figure 3:
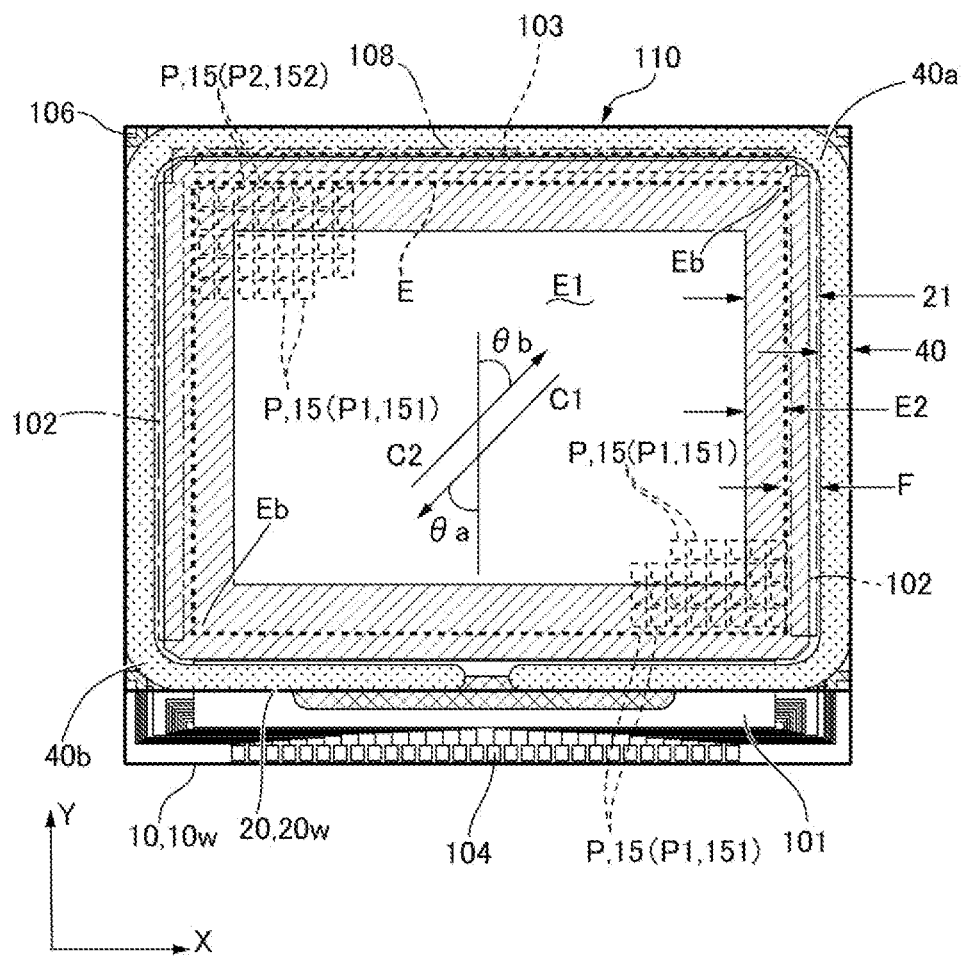
FIG. 3 is an explanatory diagram illustrating a planar configuration of the liquid crystal panel illustrated in FIG. 1.
Figure 4:
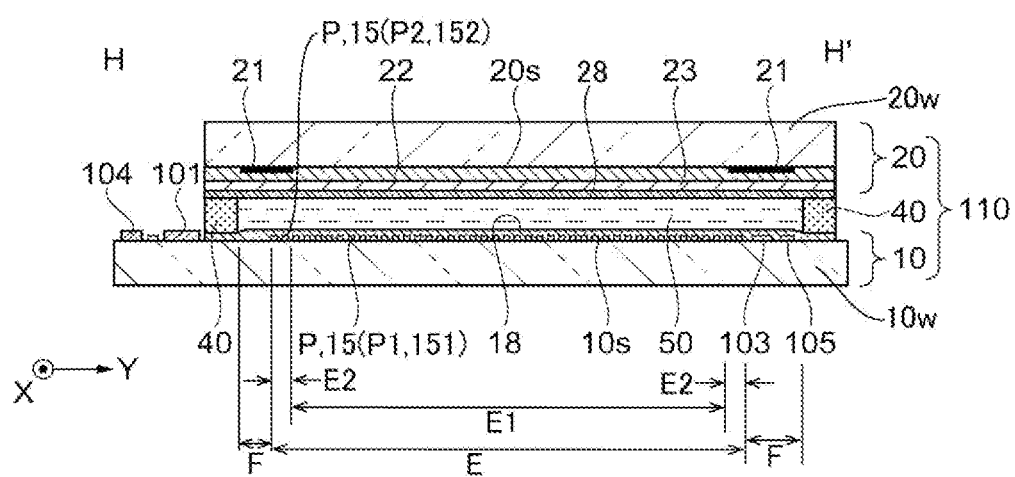
FIG. 4 is a cross-sectional view illustrating the liquid crystal panel illustrated in FIG. 3.

FIG. 3 is an explanatory diagram illustrating a planar configuration of the liquid crystal panel 110 illustrated in FIG. 1. FIG. 4 is a cross-sectional view illustrating the liquid crystal panel 110 illustrated in FIG. 3. In FIGS. 3 and 4, the liquid crystal panel 110 includes a first substrate 10, and a second substrate 20 that is opposed to the first substrate 10. The first substrate 10 and the second substrate 20 are affixed to each other with a seal material 40 having a frame shape being interposed therebetween. A liquid crystal layer 50 is disposed at the inner side of the seal material 40 and between the first substrate 10 and the second substrate substrate 20. The first substrate 10 includes a substrate body 10w comprised of a transmissive substrate such as a quartz substrate or a glass substrate. A portion extending from the substrate body 10w to a first alignment film 18 corresponds to the first substrate 10. The second substrate 20 includes a substrate body 20w comprised of a transmissive substrate such as a quartz substrate or a glass substrate. A portion extending from the substrate body 20w to a second second alignment film 28 corresponds to the second substrate 20.

The first substrate 10 is larger than the second substrate 20. The seal material 40 is disposed along the outer edge of the second substrate 20. The liquid crystal layer 50 is made out of a liquid crystal material having a positive or negative dielectric anisotropy. The seal material 40 is made out of an adhesive such as a thermosetting or ultraviolet curing epoxy resin or the like, and also includes a spacer (not illustrated) used to maintain a constant distance between the first substrate 10 and the second substrate 20.

The liquid crystal panel 110 includes a pixel area E provided within a region surrounded by the seal material 40. The second substrate 20 includes a partition portion 21 provided in a peripheral area F that is disposed between the seal material 40 and the pixel area E and configured to surround the periphery of the pixel area E. The partition portion 21 is comprised of a light shielding layer made of metal, metallic oxide, or the like. The light shielding layer may be configured as a black matrix that overlaps, in plan view, with a boundary portion between adjacent pixels P, with respect to the second substrate 20.

At a one-side surface 10s side of the first substrate 10 that is opposed to the second substrate 20, a plurality of terminals 104 are arrayed along one side of the outside of the seal material 40. In addition, a data line driving circuit 101 is provided between the terminals 104 and the pixel area E. At the one-side surface 10s side of the first substrate 10, a scanning line drive circuit 102 is provided outside of the pixel area E and along each of two sides adjacent to the side where the terminals 104 are arrayed. In addition, an inspection circuit 103 and a wiring line 108 are provided along a side that is opposed to the side where the terminals 104 are arrayed. A plurality of wiring lines connected to the data line driving circuit 101 and the scanning line drive circuit 102 are each connected to each of the plurality of terminals 104. Below, description will be made such that the X-axis direction is a direction in which the terminals 104 are arrayed, and the Y-axis direction is a direction perpendicular to the X-axis direction.

At the one-side surface 10s side of the first substrate 10, a pixel electrode 15 is disposed at each of the plurality of pixels P disposed in the X-axis direction and the Y-axis direction in the pixel area E, and a first alignment film 18 configured to cover the pixel electrode 15 is provided. In addition, although illustration is not given, a pixel switching element, a wiring line, and the like are provided at the one-side surface 10s side of the first substrate 10. The pixel electrode 15 is comprised of an electrically conductive transmissive film made of indium tin oxide (ITO) or the like.

At a one-side surface 20s side of the second substrate 20 that is opposed to the first substrate 10, there is provided: a partition portion 21; a flattening layer 22 configured to cover the partition portion 21; a common electrode 23 configured to cover the flattening layer 22; and a second alignment film 28 configured to cover the common electrode 23. The partition portion 21 overlaps, in plan view, with the scanning line drive circuit 102 and the inspection circuit 103. The flattening layer 22 is made of inorganic material such as silicon oxide or the like. The common electrode 23 23 is made of ITO or the like, and is electrically connected to an upward-downward conduction portion 106 provided between the first substrate 10 and the second substrate 20 and also to terminals 104 through wiring lines provided at the first substrate 10.

The first alignment film 18 and the second alignment film 28 are selected on the basis of optical design of the liquid crystal panel 110. The first alignment film 18 and the second alignment film 28 are comprised, for example, of an inorganic alignment film containing an inorganic material such as silicon oxide (SiOx) or the like and formed through a gas phase method such as vapor deposition. In this case, the first alignment film 18 and the second alignment film 28 are configured such that liquid crystal molecules having negative dielectric anisotropy are substantially vertically aligned. The first alignment film 18 and the second alignment film 28 may be configured with an organic alignment film made of polyimide or the like and having a front surface being rubbed. In this case, the organic alignment film is configured such that liquid crystal molecules having positive dielectric anisotropy are substantially horizontally aligned.

The liquid crystal panel 110 configured as described above is of a transmission type. Thus, the liquid crystal panel 110 is configured as a liquid crystal device having a normally white mode in which the transmittance of the pixels P is maximized in a state in which no voltage is applied or having a normally black mode in which the transmittance of the pixels P is minimized in a state in which no voltage is applied, in accordance with optical design of a polarizing element disposed at each of the light incidence side and the light output side with respect to the liquid crystal panel 110. In the following description, an inorganic alignment film is used as the first alignment film 18 and the second alignment film 28, a liquid crystal material having negative dielectric anisotropy is used for the liquid crystal layer 50, and a normally black mode is used as the optical design.

The first alignment film 18 and the second alignment film 28 are inorganic alignment films, and are each comprised of an aggregate of columns that are obtained by diagonally depositing and growing an inorganic material such as silicon oxide in a columnar shape. Thus, in the liquid crystal layer 50, liquid crystal molecules have a pre-tilt angle of 3° to 5° with respect to the normal-line direction with respect to the first substrate 10 and the second substrate 20, and are substantially vertically aligned (VA; Vertical Alignment). When a driving signal is applied between the pixel electrode 15 and the common electrode 23, an inclination of the liquid crystal molecules changes in accordance with an electric field direction generated between the pixel electrode 15 and the common electrode 23.

An obliquely deposited direction applied at the time of forming the first alignment film 18 at the first substrate 10 is, for example, a direction indicated by the arrow C1 in FIG. 3, and is a direction that forms an angle θa with the Y-axis direction. An obliquely deposited direction applied at the time of forming the second alignment film 28 at the second substrate 20 is, for example, a direction indicated by the arrow C2 in FIG. 3, and is a direction that forms the angle θb with the Y-axis direction. These deposited directions make it possible to define the alignment direction of liquid crystal molecules. The angles θa and θb are, for example, 45 degrees. The direction of oblique deposition at the time of forming the first alignment film 18 at the first substrate 10 and the direction of oblique deposition at the time of forming the second alignment film 28 at the second substrate 20 are opposite to each other.

The pixel area E includes a display region E1 and a dummy pixel region E2 around the display region E1. In the display region E1, of the plurality of pixels P, display pixels P1 that directly contribute to display of an image are arranged. The dummy pixel region region E2 includes a plurality of dummy pixels P2 of the plurality of pixels P, and the dummy pixels P2 do not directly contribute to display of an image. Thus, of the plurality of pixels electrode 15, a pixel electrode 15 provided in the display pixel P1 is a first pixel electrode 151 called an active pixel electrode or the like, and a pixel electrode 15 provided in the dummy pixel P2 is a second pixel electrode 152 called a dummy pixel electrode or the like.

Since the liquid crystal panel 110 has a normally black mode in the present embodiment, fixed potential or AC potential that causes the dummy pixel P2 to display black is applied to the second pixel electrode 152, regardless of the display state at the display pixel P1. Note that, in the present embodiment, the partition portion 21 is formed in a region where the peripheral area F and the dummy pixel region E2 overlap with each other in plan view, so that the dummy pixel P2 is not visually recognized. Note that, although the partition portion 21 overlaps with the peripheral area F in plan view, the partition portion 21 may be provided so as not to overlap with the dummy pixel region E2 in plan view. In this case, the dummy pixel region E2 together with the partition portion 21 functions as an electronic parting that constitutes a parting.

1-3. Change of Liquid Crystal Panel Over Time and Photoluminescence

As the liquid crystal panel 110 is used for a long period of time, the display quality thereof may change. In particular, in a case of the liquid crystal panel 110 employed in the projection-type display device 200 having a light source such as laser having high luminance, light having high luminous flux density enters the panel. Thus, the display quality thereof tends to change over time and deteriorate. One of the factors that cause the display quality of the liquid crystal panel 110 to deteriorate is considered to be a deterioration of liquid crystal itself, and it is assumed that the composition of liquid crystal molecules or alignment property changes due to light irradiation.

During a process of an accelerated degradation test executed to monitor change in the liquid crystal panel 110 over time, the present inventor finds that illumination assumed to be photoluminescence of liquid crystal can be detected. Specifically, in the liquid crystal panel 110 that have been irradiated with blue light, red light is strongly observed. This red light is assumed to to be photoluminescence resulting from deteriorated liquid crystal. The radiated light Z illustrated in FIG. 1 is photoluminescence (phosphorescence) coming from the liquid crystal panel 110.

Figure 5:
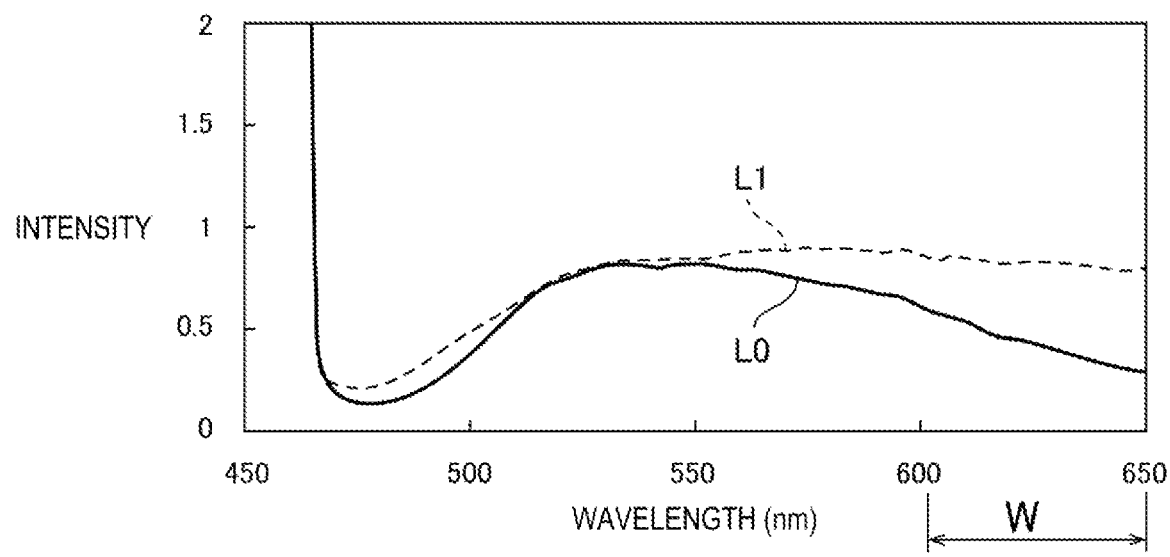
FIG. 5 is an explanatory diagram illustrating a change in photoluminescence over time when light is emitted to a liquid crystal.

FIG. 5 is an explanatory diagram illustrating a change in photoluminescence over time when light is emitted to liquid crystal.

The horizontal axis indicates measurement wavelengths, and the vertical axis indicates the light intensity observed at liquid crystal irradiated with blue light. The solid line L0 indicates spectra at the initial stage when blue light starts to be emitted, and the dashed line L1 indicates spectra at a stage when blue light has been emitted for a certain period of time. Spectra other than the spectrum corresponding to incident light are assumed to be based on photoluminescence of liquid crystal molecules or deteriorated liquid crystal molecules.

As illustrated in FIG. 5, by emitting blue light having an intensity peak at or around 450 nm to liquid crystal for a certain period of time, it can be understood that the intensity of spectrum of the radiated light output from liquid crystal increases. In particular, the intensity in a frequency band W having a wavelength ranging from 550 nm to 650 nm increases, and light in which the percentage of red-color component increases is observed. Predetermined light is emitted at the time when an electron makes a transition between liquid crystal molecules. When liquid crystal molecules deteriorated due to photochemical reaction or the like exist, it is assumed that radiated light containing phosphorescence having a wavelength ranging from 550 nm to 650 nm is output.

Figure 6:
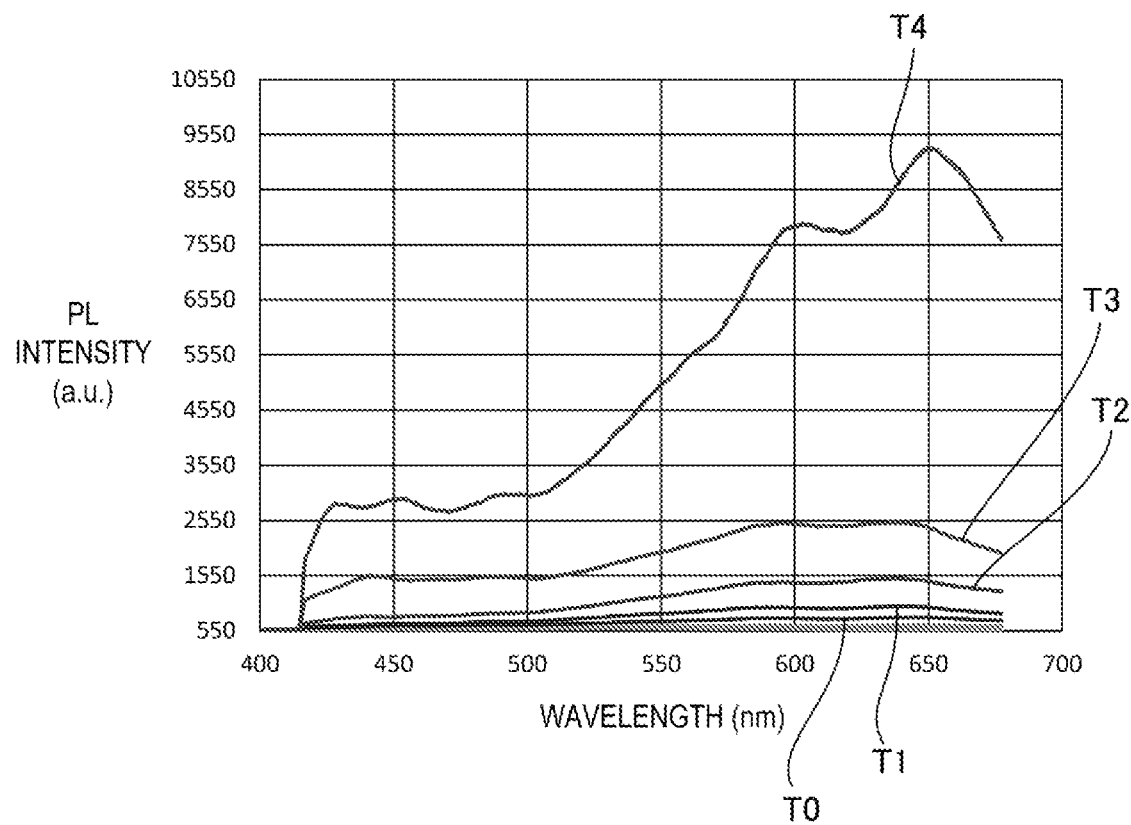
FIG. 6 is an explanatory diagram illustrating a change in photoluminescence (phosphorescence) over time during an accelerated degradation test on a liquid crystal panel.
Figure 7:
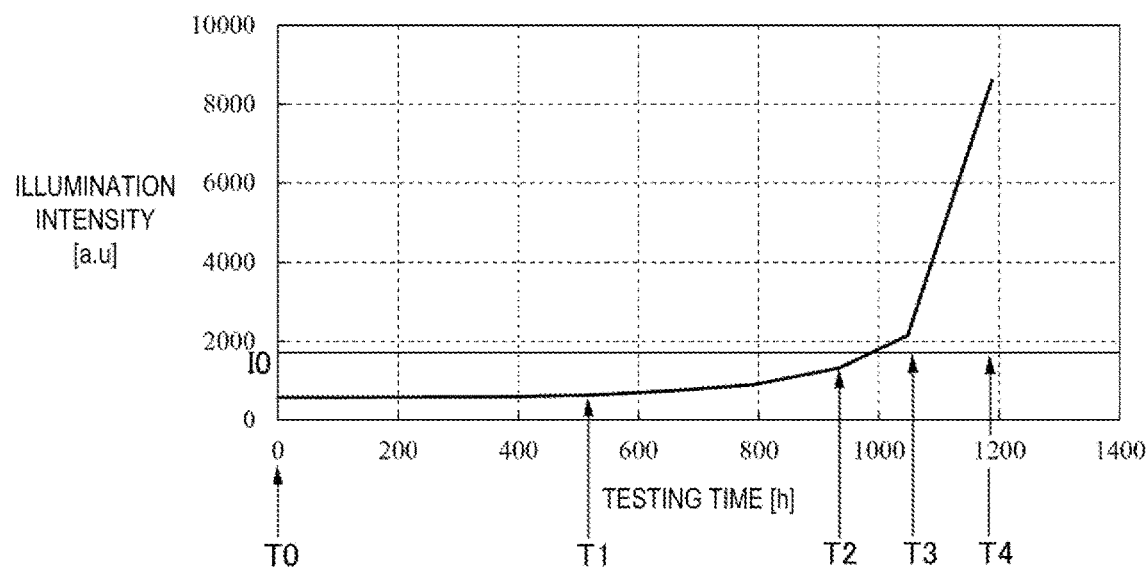
FIG. 7 is an explanatory diagram illustrating a change in photoluminescence (phosphorescence) over time during an accelerated degradation test on a liquid crystal panel.

FIGS. 6 and 7 are explanatory diagrams illustrating a change change in photoluminescence (phosphorescence) over time during an accelerated degradation test on the liquid crystal panel 110. FIG. 6 is a diagram illustrating spectra for each of testing times T0, T1, T2, T3, and T4. In this diagram, the horizontal axis indicates measurement wavelengths, and the vertical axis indicates the light intensity observed at the liquid crystal panel 110. FIG. 7 is a diagram illustrating a change in light intensity over time in the frequency band W ranging from 500 nm to 650 nm. In FIG. 7, the horizontal axis indicates testing time, and the vertical axis indicates the light intensity observed at the liquid crystal panel 110. FIG. 7 illustrates points corresponding to the testing times T0, T1, T2, T3, and T4 illustrated in FIG. 6. During the accelerated degradation test illustrated in FIGS. 6 and 7, blue light having high luminous flux density is emitted to the liquid crystal panel 110, and a device equivalent to the optical sensor device 1 is used to monitor the liquid crystal panel 110 from the light incidence side.

Figure 8:
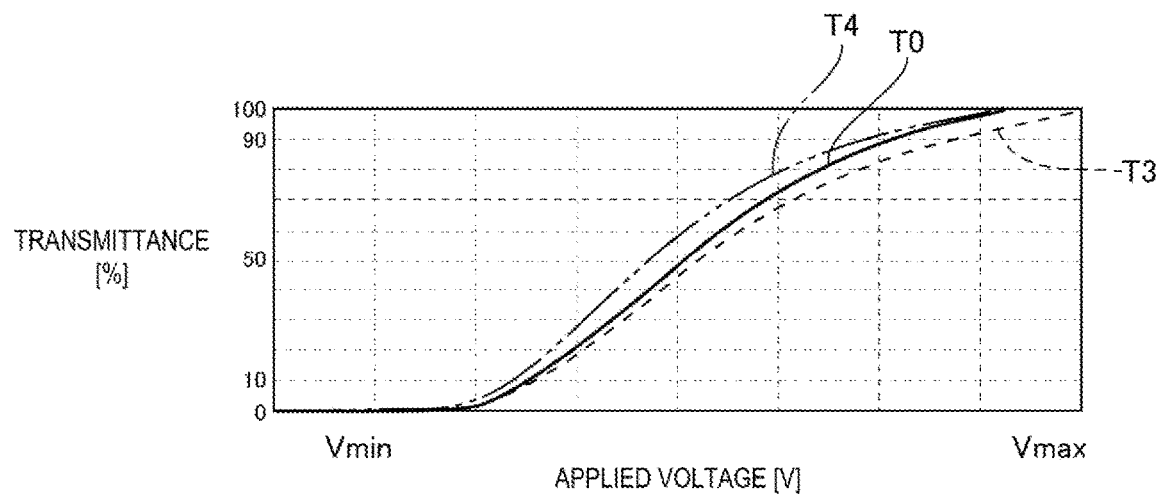
FIG. 8 is an explanatory diagram illustrating an electro-optic property (V-T property) of a liquid crystal panel.

FIG. 8 is an explanatory diagram illustrating an electro-optic property (V-T property) of the liquid crystal panel 110. In the diagram, the vertical axis indicates the transmittance, and the horizontal axis indicates applied voltages to the liquid crystal element LC. FIG. 8 illustrates V-T curves of the liquid crystal panel 110 that correspond to the testing times T0, T3, and T4.

The change over time in the light intensity observed with the liquid crystal panel 110 is caused mainly by a change over time in the intensity of photoluminescence of the liquid crystal panel 110. The testing time T0 indicates the initial state, and T0<T1<T2<T3<T4 establishes. Emission of the blue light causes an increase in the intensity of spectrum of the radiated light resulting from photoluminescence of liquid crystal. At the testing times T1 and T2, the intensity of photoluminescence from the liquid crystal panel 110 increases in the frequency band W ranging from 500 nm to 650 nm. At the testing times T3 and T4, the intensity of photoluminescence further increases in the entire measurement wavelength range, and the intensity of photoluminescence significantly increases in the frequency band W ranging from 500 nm to 650 nm. The testing times T3 and T4 are 1.1 times and 1.2 times longer than the testing time T2, respectively, and the intensity of photoluminescence at these times are 1.5 times and 3 or more times higher than the intensity of photoluminescence at the testing time T2. The V-T curve of the liquid crystal panel 110 at the testing time time T3 changes toward a darker direction, and the V-T curve of the liquid crystal panel 110 at the testing time T4 changes toward a brighter direction, indicating that the display quality of the liquid crystal panel 110 deteriorates. It can be understood that the deterioration of the liquid crystal panel 110 dramatically increases from the testing time T3. Thus, the deterioration of the liquid crystal panel 110 can be identified on the basis of a change in the intensity of photoluminescence of the liquid crystal panel 110. Note Note that the increase in the intensity of photoluminescence of the liquid crystal panel 110 is assumed to be caused by an increase in the concentration of deteriorated liquid crystal molecules. At and after the testing time T4, liquid crystal molecules further deteriorate, and the display quality of the liquid crystal panel 110 cannot be recovered by correction or the like, resulting in the end of service life of the liquid crystal panel 110. Determination of service life is made, for example, such that the liquid crystal panel 110 reaches the end of its service life at a time of detecting the intensity I0 of photoluminescence observed between the testing time T2 and the testing time T3, as illustrated in FIG. 7. The intensity I0 of photoluminescence can be set to a limit value I0 corresponding to the liquid crystal panel 110.

Thus, by detecting the intensity of photoluminescence output from the liquid crystal panel 110, it is possible to monitor a deterioration of liquid crystal and a deterioration of liquid crystal panel 110 caused by the deterioration of liquid crystal. Note that, when blue light continues to be emitted to liquid crystal for a certain period of time, the radiated light Z radiated from the liquid crystal panel 110 contains fluorescence having a wavelength ranging from 600 nm to 650 nm. In addition, when the wavelength of light emitted to liquid crystal is shorter, a deterioration due to photochemical reaction or the like is more likely to advance.

1-4. Monitor Deterioration of Liquid Crystal Panel 110

In the present embodiment, of the first liquid crystal panel 110B, the second liquid crystal panel 110G, and the third liquid crystal panel 110R, the first liquid crystal panel 110B includes the optical sensor device 1 configured to detect radiated light Z radiated from the first liquid crystal panel 110B when light having a first wavelength range enters the first liquid crystal panel 110B as illustrated in FIGS. 1 and 2. The optical sensor device 1 detects radiated light Z having a wavelength range longer than the first wavelength range. More specifically, the optical sensor device 1 detects phosphorescence having a wavelength ranging from 600 nm to 650 nm. Here, the optical sensor device 1 employs a mode in which the wavelength of incident light to a photoreceptor element is limited to a range from 600 nm to 650 nm using a filter or the like. In addition, the optical sensor device 1 can also employ a mode in which the intensity of light having a frequency band ranging from 600 nm to 650 nm is extracted from a result of light received by the photoreceptor element.

In the present embodiment, as illustrated in FIG. 1, the mirror 2106 disposed at the most downstream side is configured to guide, to the first liquid crystal panel 110B, blue light that is light having a first wavelength range from among light output from the white light source unit 2102. For the mirror 2106, a dichroic mirror is used. This dichroic mirror is configured to reflect blue light that is light having a first wavelength range and allow red light that is light having a third wavelength range to pass through. The optical sensor device 1 is disposed at an opposite side, of the mirror 2106, from the first liquid crystal panel 110B. Thus, the optical sensor device 1 is able to detect, through the mirror 2106, the radiated light Z that is radiated from a surface of the first liquid crystal panel 110B at the light incidence side.

In addition, as illustrated in FIG. 2, the present embodiment includes a determining unit 2 configured to determine service life of the first liquid crystal panel 110B on the basis of a result obtained by the optical sensor device 1 detecting the radiated radiated light Z having a wavelength ranging from 600 nm to 650 nm. Furthermore, the determining unit 2 determines whether or not the intensity of the radiated light Z that is photoluminescence exceeds the limit value I0. When the intensity of the radiated light Z exceeds exceeds the limit value I0, the determining unit 2 makes notification to that effect.

Figure 9:
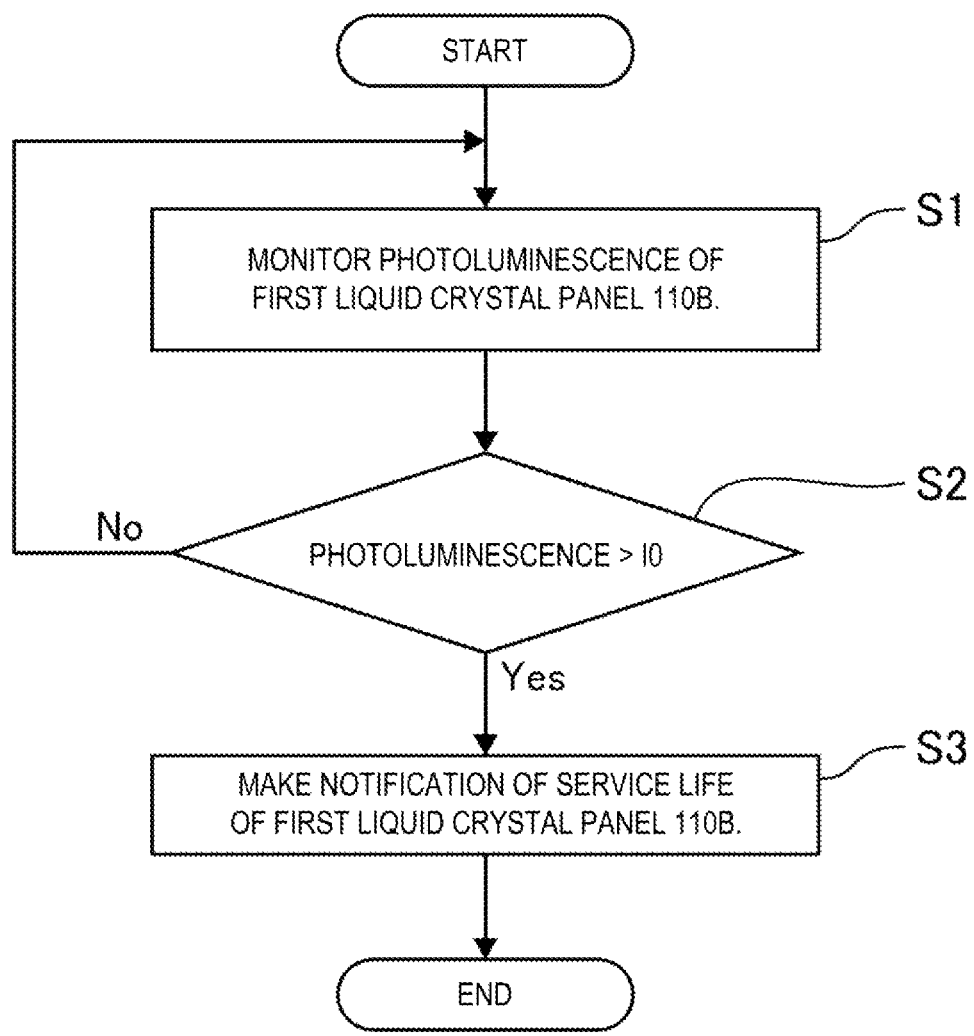
FIG. 9 is an explanatory diagram showing a flow of determining service life of a liquid crystal panel.

More specifically, in the determining unit 2, the limit value I0 (see FIG. 7) corresponding to the service life of the first liquid crystal panel 110B is set for the intensity of the radiated light Z having a wavelength ranging from 600 nm to 650 nm. The determining unit 2 makes notification of the period of time until the service life of the liquid crystal panel 110 by using an image or the like, on the basis of the intensity of the detected radiated light Z. Furthermore, when the intensity of the radiated light Z exceeds the limit value I0, the determining unit 2 makes notification that the first liquid crystal panel 110B reaches its service life, by using an image, audio, or the like. The image may be superimposed on an image signal generated by the image processing unit 71 and be displayed at the liquid crystal panel 110 to be projected. In addition, there may be provided a notification unit configured to make notification to that effect by using an image, audio, or the like. FIG. 9 shows a flow of making notification of the service life of the first liquid crystal panel 110B when the intensity of the radiated light Z exceeds the limit value I0. The determining unit 2 monitors photoluminescence of the first liquid crystal panel 110B through the optical sensor device 1 (step S1). Upon determining that the intensity of photoluminescence exceeds the limit value I0 (step S2: YES), the determining unit 2 makes notification that the first liquid crystal panel 110B reaches its service life, or notification of a period of time remaining until its service life (step S3).

Figure 10:
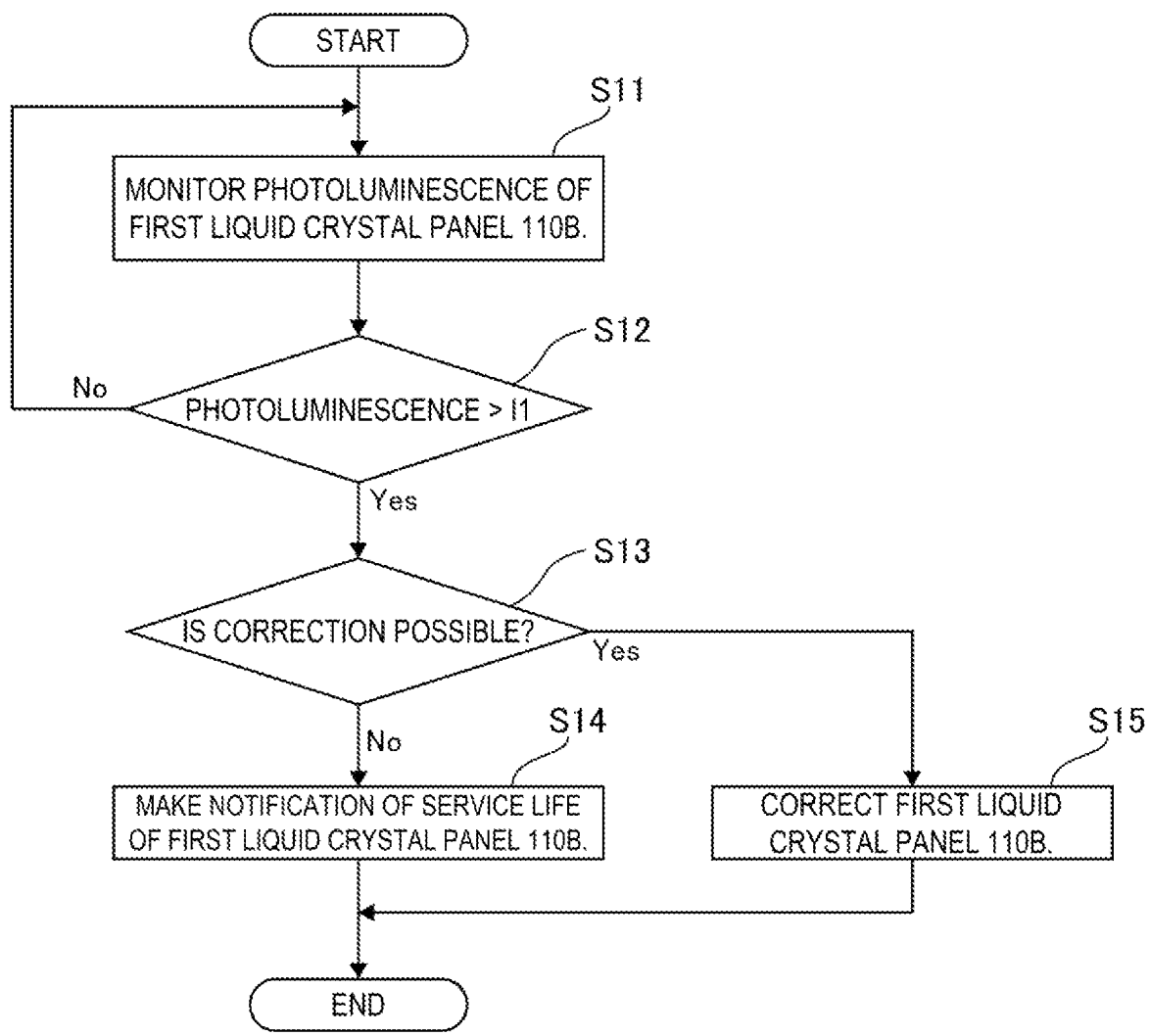
FIG. 10 is an explanatory diagram showing a flow of correction for a liquid crystal panel.

Furthermore, the determining unit 2 may not only make notification of the service life of the first liquid crystal panel 110B but also cause the drive of the first liquid crystal panel 110B to be corrected in order to suppress a reduction in the display quality. The determining unit 2 gives the image processing unit 71 an instruction to correct a gray-scale signal VL so as to get close to the V-T curve corresponding to the testing time T0 illustrated in FIG. 7. The driving circuit 105 supplies a corrected image signal VD [j] to each of the plurality of pixels P, on the basis of the corrected corrected gray-scale signal VL. As illustrated in FIG. 10, the determining unit 2 monitors the radiated light Z that is photoluminescence of the first liquid crystal panel 110B through the optical sensor device 1 (step S11). Upon determining that the intensity of the radiated light Z exceeds a threshold value I1 (step S12: YES), the determining unit 2 determines whether or not it is possible to correct drive of the first liquid crystal panel 110B (step S13). When it is possible to correct drive of the first liquid crystal crystal panel 110B, the determining unit 2 corrects the drive of the first liquid crystal panel 110B (step S15). When it is not possible to correct the drive of the first liquid crystal panel 110B, the determining unit 2 makes notification that the first liquid crystal panel 110B reaches its service life (step S14). For example, through experiments, the determining unit 2 calculates a correction amount for bringing the V-T curve corresponding to the testing times T2 and T3 illustrated in FIG. 7 close to the V-T curve of the testing time T0, and holds the calculated correction amount so as to be associated with the light intensity of the radiated light Z corresponding to each of the testing times T2 and T3. When the optical sensor device 1 detects the threshold value I1 and on the basis of the correction amount corresponding to this, it is possible for the image processing unit 71 to correct the gray-scale signal VL, the determining unit 2 gives an instruction to correct the gray-scale signal VL. For example, the threshold value I1 is a light intensity of the radiated light Z corresponding to the testing times T2 and T3 in FIG. 7, and it is possible to correct drive of the first liquid crystal panel 110B. When the light intensity of the radiated light Z corresponding to the testing time T4 in FIG. 7 is the threshold value I1, it is not possible to correct the drive of the first liquid crystal panel 110.

This monitoring of the radiated light Z output from the first liquid crystal panel 110B continues during a period of time when the first liquid crystal panel 110B in the display device 200 performs a display operation. Furthermore, during a period of time when blue light having the first wavelength range and coming from the white light source unit 2102 is emitted to the first liquid crystal panel 110B, it may be possible to employ a mode in which the radiated light Z output from the first liquid crystal panel 110B is monitored during period of time when the display operation is not performed by the first liquid crystal panel 110B. In addition, a mechanism that causes blue light having a first wavelength range to be emitted to the first liquid crystal panel 110B may be provided as a separate mechanism.

In this manner, the present embodiment includes the optical sensor device 1 configured to detect radiated light Z having a third wavelength range and radiated when light having a first wavelength range enters the first liquid crystal panel 110B, and the radiated light Z is phosphorescence corresponding to a deterioration of liquid crystal molecules. Thus, on the basis of a detection result at the optical sensor device 1, it is possible to monitor a deterioration of liquid crystal at the first liquid crystal panel 110B.

In addition, in the present embodiment, the optical sensor device 1 is provided at the first liquid crystal panel 110B where incident light having the shortest wavelength enters, from among the first liquid crystal panel 110B, the second liquid crystal panel 110G, and the third liquid crystal panel 110R. Thus, even if no optical sensor device 1 is provided at the second liquid crystal panel 110G and the third liquid crystal panel 110R, it is possible to monitor a deterioration of the liquid crystal panel 110 in the display device 200.

1-5. First Modification Example of First Embodiment

Figure 11:
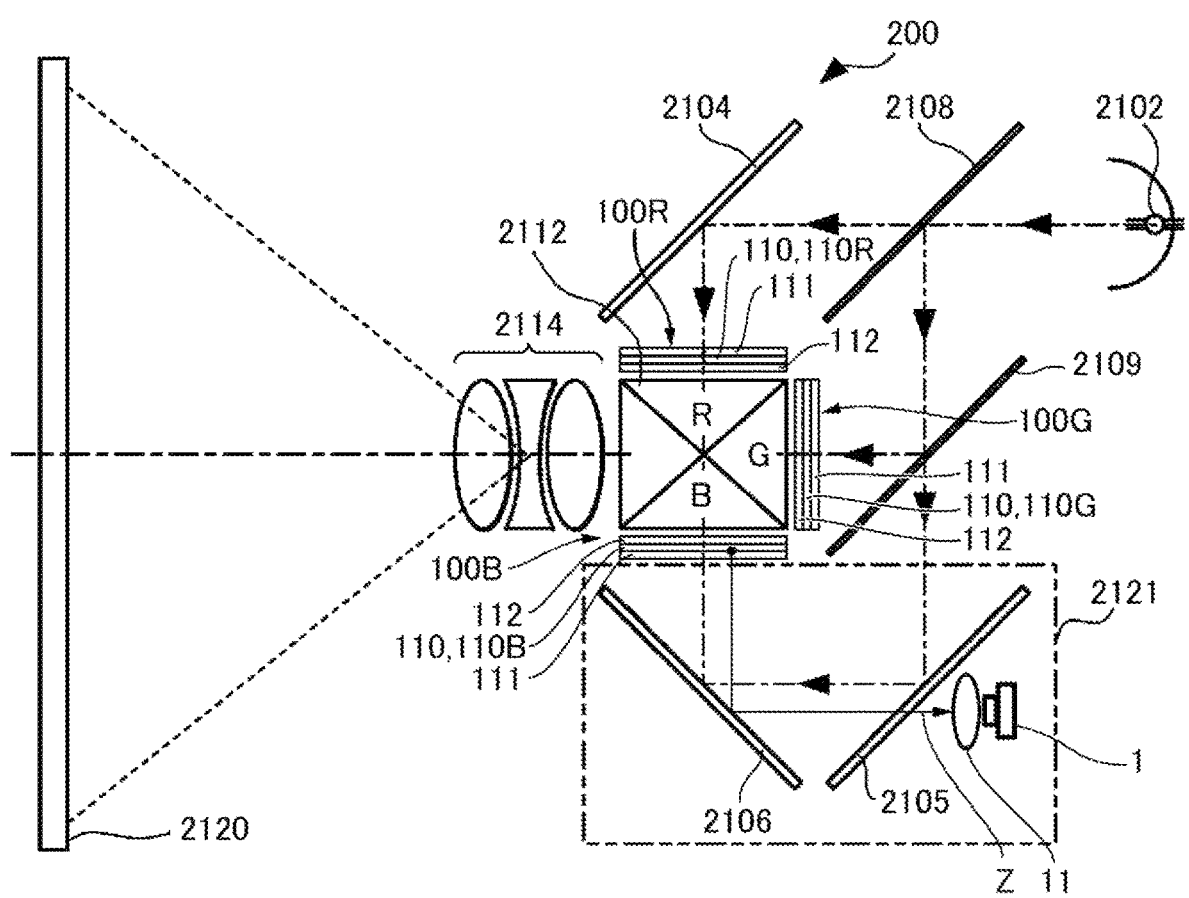
FIG. 11 is an explanatory diagram illustrating a projection-type display device according to a first modification example of the first embodiment of the present disclosure.

FIG. 11 is an explanatory diagram illustrating a projection-type display device 200 according to a first modification example of the first embodiment of the present disclosure. The optical sensor device 1 is disposed at an opposite side, of the mirror 2105, from the first liquid crystal panel 110B. Note that the basic configuration of the present mode is similar to that in the first embodiment. Thus, illustration is made such that the same reference characters are attached to equivalent portions, and explanation thereof will not be made.

In the mode illustrated in FIG. 1, the mirror 2106 at the most downstream side is a dichroic mirror. However, the radiated light Z radiated from the first liquid crystal panel 110B and having the third wavelength range may be detected through the synthesis optical system 2112 and the mirrors 2106 and 2105, as illustrated in FIG. 11. A dichroic mirror configured to reflect blue light and red light is used for the mirror 2106. A dichroic mirror that allows red light to pass through is used for the mirror 2105.

1-6. Second Modification Example of First Embodiment

Figure 12:
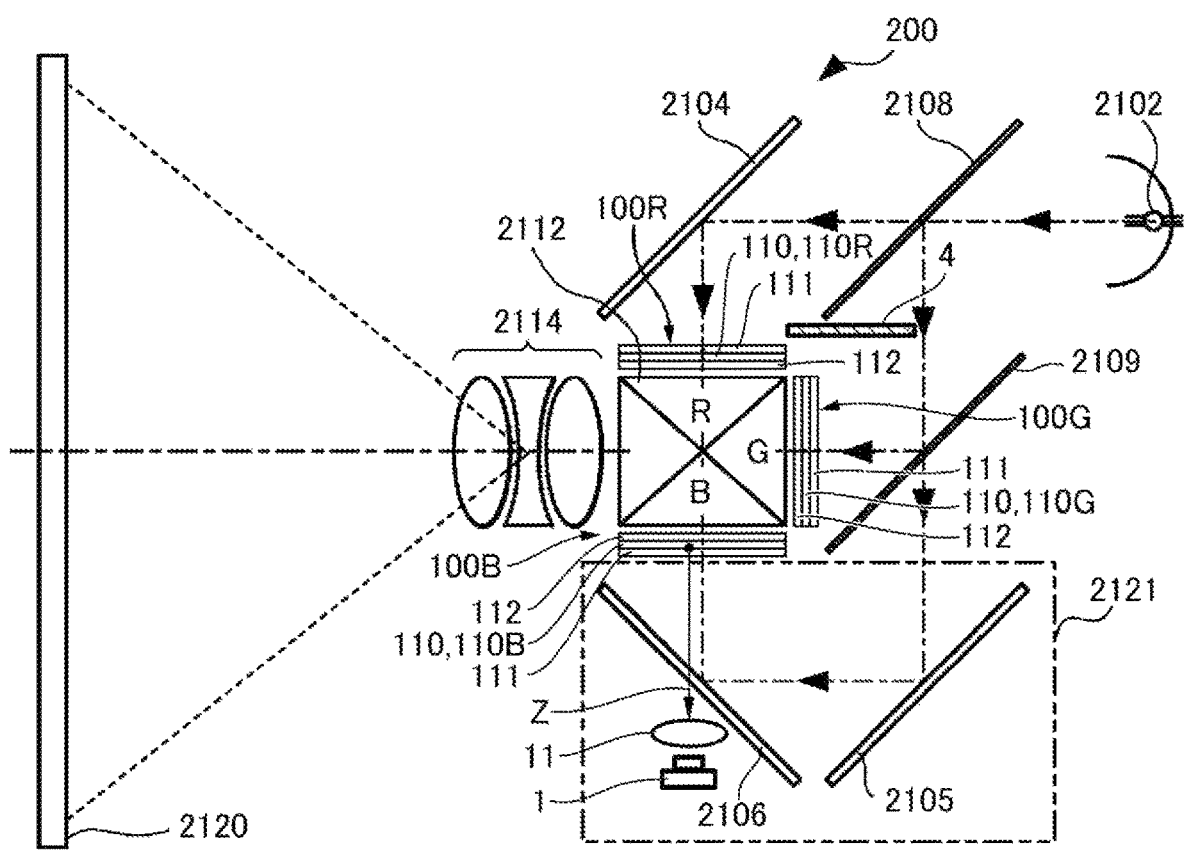
FIG. 12 is an explanatory diagram illustrating a projection-type display device according to a second modification example of the first embodiment of the present disclosure.

FIG. 12 is an explanatory diagram illustrating a projection-type display device 200 according to a second modification example of the first embodiment of the present disclosure. Note that the basic configuration of the present mode is similar to that in the first embodiment. Thus, illustration is made such that the same reference characters are attached to equivalent portions, and explanation thereof will not be made. The display device 200 according to the present mode includes a light shielding member 4 provided in a red-light path toward the third liquid crystal panel 110R and configured to prevent red light from leaking toward the optical sensor device 1. Thus, the optical sensor device 1 is able to accurately detect phosphorescence radiated from the first liquid crystal panel 110B and having the third wavelength range.

2. Second Embodiment

Figure 13:
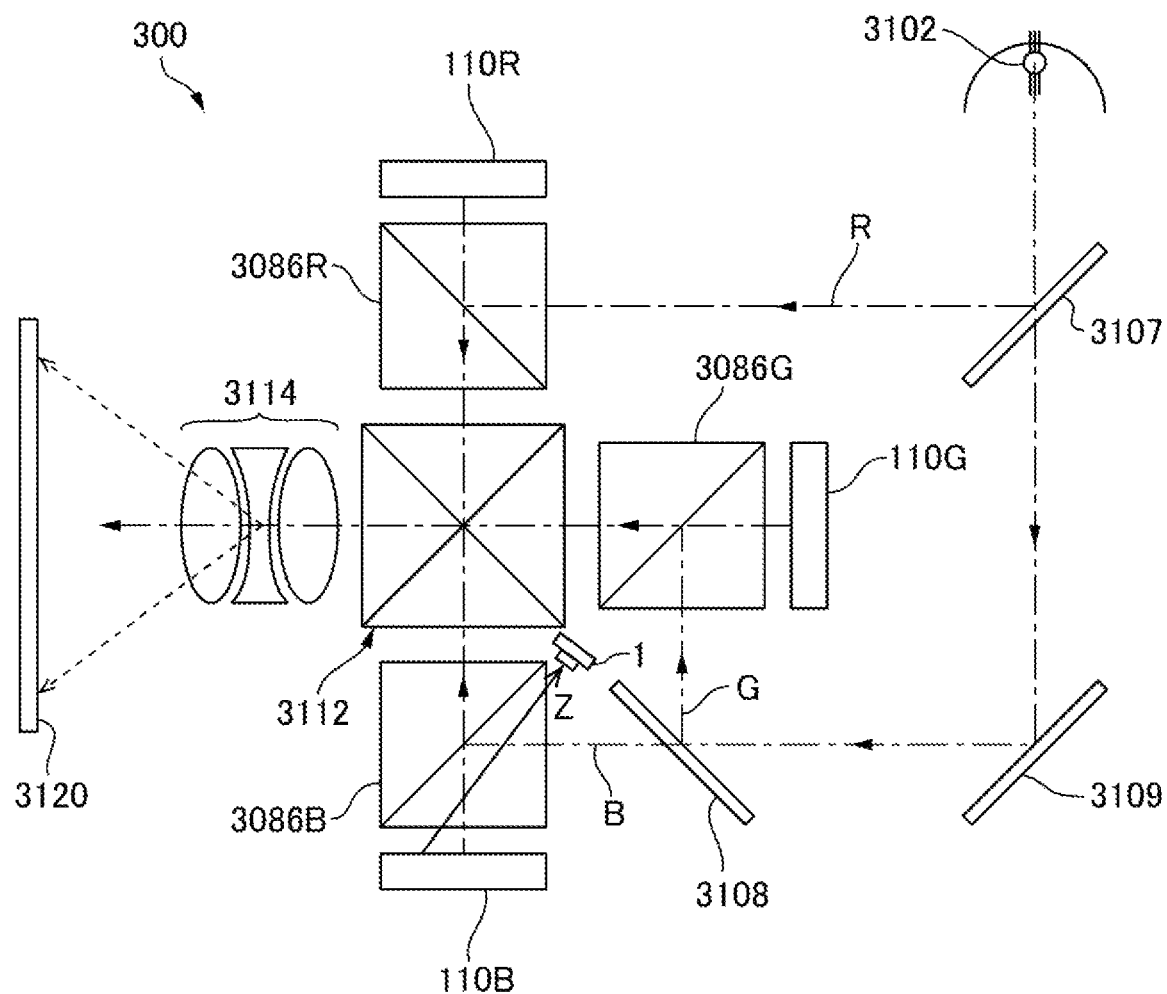
FIG. 13 is an explanatory diagram illustrating a projection-type display device according to a second embodiment of the present disclosure.

FIG. 13 is an explanatory diagram illustrating a projection-type display device 300 according to a second embodiment of the present disclosure. Note that the basic configuration of the present mode is similar to that in the second embodiment. Thus, illustration is made such that the same reference characters are attached to equivalent portions, and explanation thereof will not be made.

Although the transmissive-type liquid crystal panel 110 is used for the projection-type display device 200 according to the first embodiment, the liquid crystal panel 110 is a reflection-type in the projection-type display device 300 according to the present mode. More specifically, in the liquid crystal panel 110 illustrated in FIG. 4, the pixel electrode 15 is made of reflective metal such as aluminum or the like.

In this display device 300, light source light output from a white light source unit 3102 is split into three primary colors of red (R), green (G), and blue (B) using two dichroic mirrors 3107 and 3108 and a mirror 3109, which are provided inside. Specifically, the dichroic mirror 3107 is configured to reflect red (R) light of incident light and allow the other color lights to pass through, thereby splitting the incident light into red (R) light and the other color lights. The mirror 3109 is disposed on an optical path for the other color lights split by the dichroic mirror 3107. The dichroic mirror 3108 is configured to reflect green (G) light of incident light and allow blue (B) light to pass through, thereby splitting the incident light into green (G) light and blue B light.

Here, the display device 300 includes polarized beam splitters 3086B, 3086G, and 3086R provided between a synthesis optical optical system. 3112 comprised of dichroic prisms and the first liquid crystal panel 110B, the second liquid crystal panel 110G, and the third liquid crystal panel 110R, respectively. The polarized beam splitters 3086B, 3086G, and 3086R are configured to synthesize the incident-light path for light source light to the liquid crystal panel 110 and the output optical path for modulated light from the liquid crystal panel 110. Thus, blue light that has passed through the dichroic mirrors 3107 and 3108 enters the polarized beam splitter 3086B to be converted into polarized light, and is emitted to the first liquid crystal panel 110B. Green light that has passed through the dichroic mirror 3107 and been reflected by the dichroic mirror 3108 enters the polarized beam splitter 3086G to be converted into polarized light, and is emitted to the second liquid crystal panel 110G. Red light that has been reflected by the dichroic mirror 3107 enters the polarized beam splitter 3086R to be converted into polarized light, and is emitted to the third liquid crystal panel 110R.

The first liquid crystal panel 110B, the second liquid crystal panel 110G, and the third liquid crystal panel 110R each modulate and reflect the incident light, and output it as modulated light toward the polarized beam splitter 3086R, 3086G, 3086B each corresponding to each color. The polarized beam splitters 3086R, 3086G, and 3086B cause the modulated light that enters from the first liquid crystal panel 110B, the second liquid crystal panel 110G, and the third liquid crystal panel 110R, to enter the synthesis optical system 3112. The synthesis optical system 3112 synthesizes three colors of modulated light to output it toward the projection optical system 3114, and the projection optical system 3114 projects, in an enlarged manner, a color image onto the projection target member 3120 such as a screen or the like.

In the present embodiment, the optical sensor device 1 is disposed at an opposite side, of the polarized beam splitter 3086B, from the first liquid crystal panel 110B. Thus, the optical sensor device 1 is able to detect red radiated light Z having the third wavelength range and radiated from the first liquid crystal panel 110B when blue light having the first wavelength range enters the first liquid crystal panel 110B. Note that, although illustration is not given, it is preferable that a light shielding member configured configured to prevent red light from leaking toward the optical sensor sensor device 1 is provided in a red-light path toward the third liquid liquid crystal panel 110R, as in the second modification example of the first embodiment.

2-1. Modification Example of Second Embodiment

Figure 14:
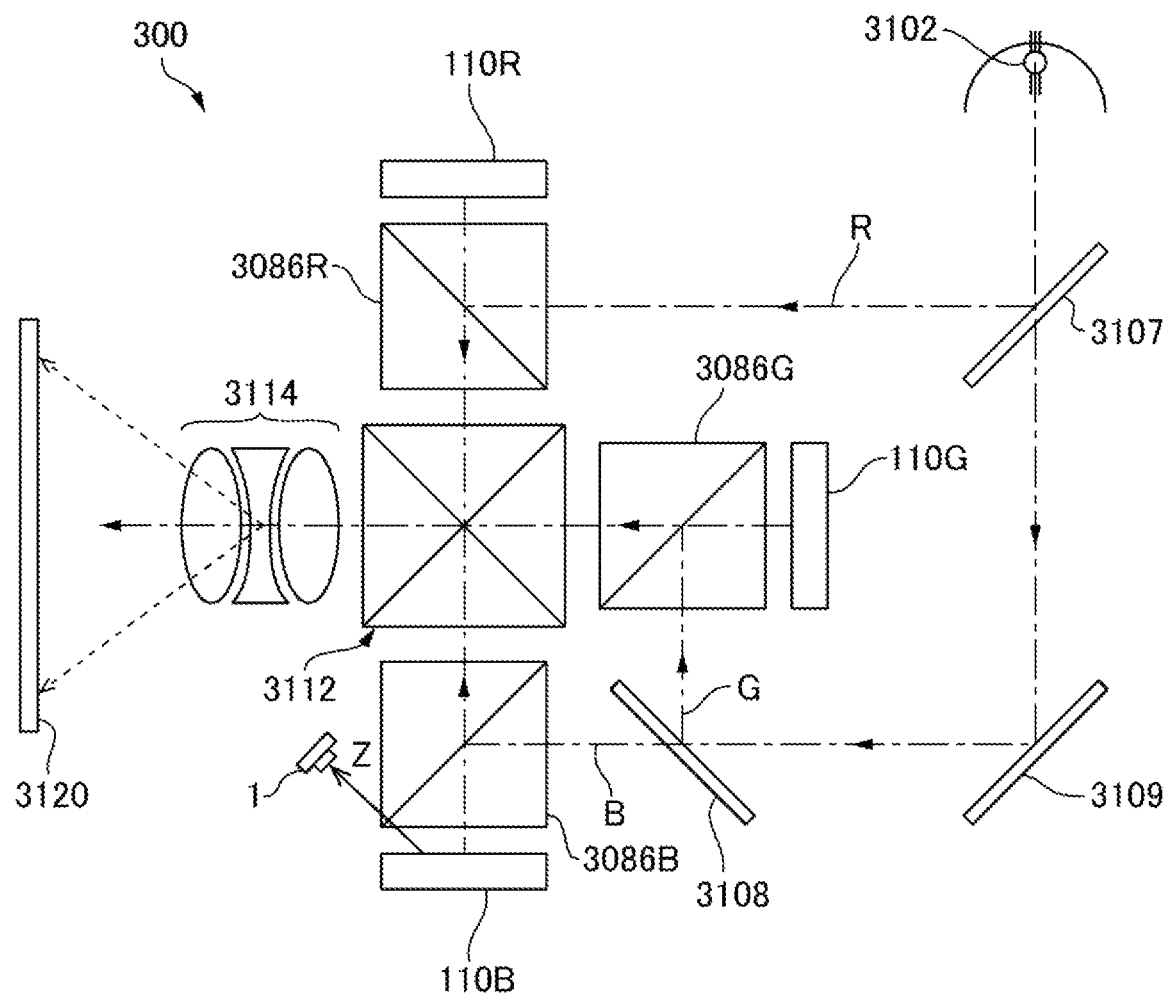
FIG. 14 is an explanatory diagram illustrating a projection-type display device according to a modification example of the second embodiment of the present disclosure.

FIG. 14 is an explanatory diagram illustrating a projection-type display device 300 according to a modification example of the second embodiment of the present disclosure. Note that the basic configuration of the present mode is similar to that in the second embodiment. Thus, illustration is made such that the same reference characters are attached to equivalent portions, and explanation thereof will not be made. In the display device 300 illustrated in FIG. 13, the optical sensor device 1 is disposed at an opposite side, of the polarized beam splitter 3086B, from the first liquid crystal panel 110B. However, it may be possible to employ a mode in which the optical sensor device 1 is disposed at a side of the polarized beam splitter 3086B, as illustrated in FIG. 14. Furthermore, the condensing lens 11 may be provided between the optical sensor device 1 and the polarized beam splitter 3086B in order to enhance the sensitivity.

3. Third Embodiment

Figure 15:
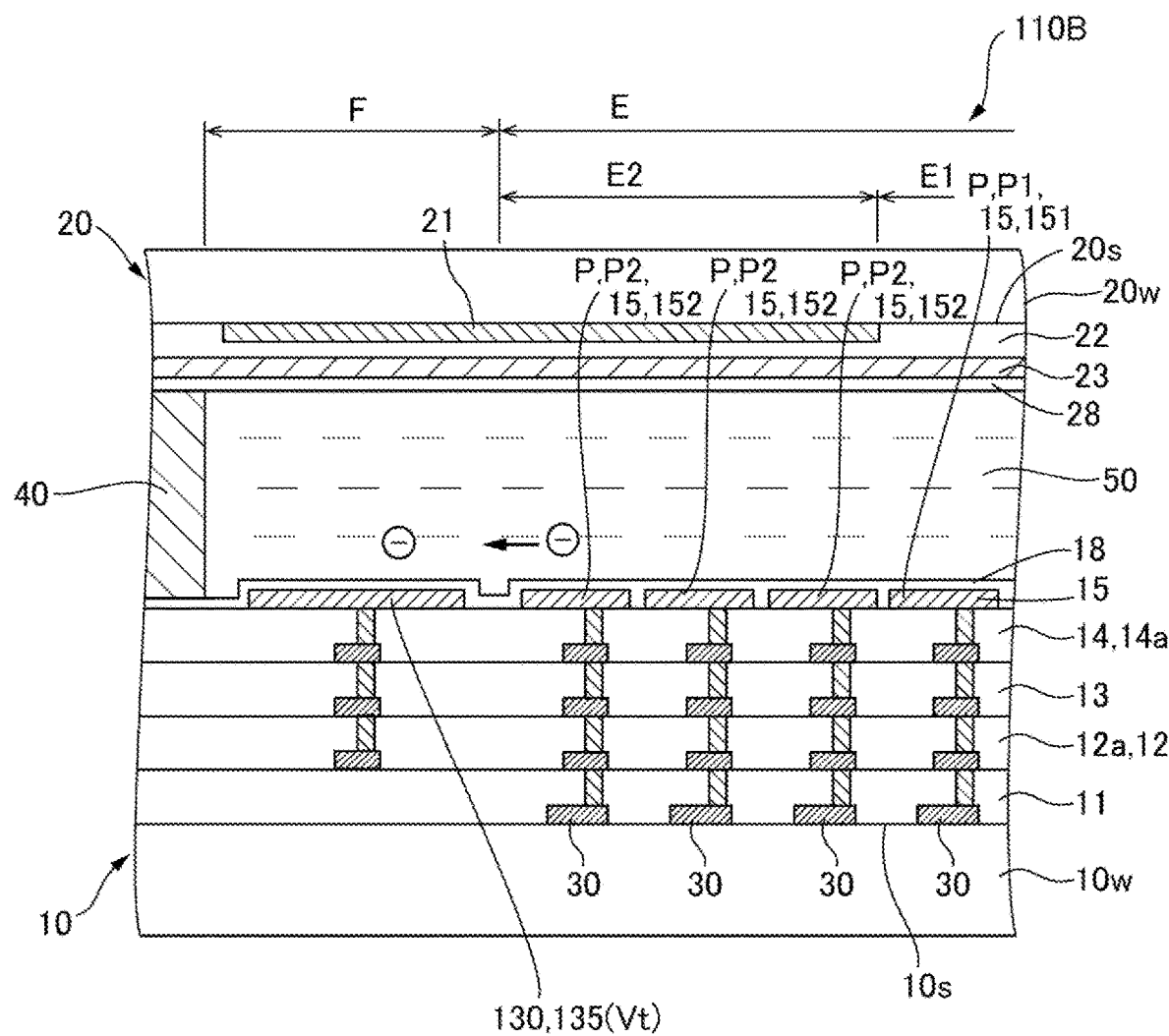
FIG. 15 is an explanatory diagram illustrating a display device according to a third embodiment of the present disclosure.

FIG. 15 is an explanatory diagram illustrating a display device according to a third embodiment, and is an enlarged cross-sectional view illustrating the configuration of an end portion portion of the first liquid crystal panel 110B. In the liquid crystal crystal panel 110 described with reference to FIG. 2 or the like, once an image signal is supplied to the pixel electrode 15 to drive the liquid crystal layer 50, liquid crystal molecules vibrate to generate a flow of liquid crystal molecules in obliquely deposited directions indicated by the arrows C1 and C2 illustrated in FIG. 3. Thus, when ionic impurities are generated when a liquid crystal material deteriorates due to photochemical reaction or the like, the ionic impurities move toward corner portions Ea and Eb of the pixel area E along the flow of liquid crystal molecules, and tend to be unevenly distributed at the corner portions Ea and Eb. In an area where these ionic impurities are unevenly distributed, a voltage applied to the liquid crystal layer 50 decreases, and a light modulation property deteriorates. Furthermore, a deterioration of a liquid crystal material due to photochemical reaction or the like is significant at the first liquid crystal panel 110B where light having the lowest wavelength range enters, from among the first liquid liquid crystal panel 110B, the second liquid crystal panel 110G, and the third liquid crystal panel 110R.

Thus, the present embodiment includes an impurity suction electrode 130 configured to draw, toward the outside of the display region E1, impurities existing at the liquid crystal layer 50 in the display region E1. The electrode 130 is disposed at the first substrate 10 and in a peripheral area F between the seal material 40 and the pixel area E. At the first liquid crystal panel 110B, the electrode 130 is driven on the basis of a result of detection of the intensity of radiated light Z by the optical sensor device 1 illustrated in FIG. 1 or the like. For example, an AC signal Vt is applied to the electrode 130. In the AC signal Vt, a potential alternately switches between a positive polarity and a negative polarity when a common potential Vcom applied to the common electrode 23 is set as a reference potential.

More specifically, the electrode 130 is driven when the intensity of the radiated light Z is higher than a set value on the basis of a result of detection of the intensity of the radiated light Z by the optical sensor device 1. Thus, during a period of time when the electrode 130 is at the positive polarity, the electrode 130 sucks anionic impurities from among ionic impurities generated due to a deterioration of the liquid crystal. In addition, during a period of time when the electrode 130 is at the negative polarity, the electrode 130 sucks cationic impurities from among ionic impurities generated due to a deterioration of the liquid crystal. Thus, impurities existing in the liquid crystal layer 50 in the display region E1 are swept from the display region E1 to the peripheral area F. This makes ionic impurities less likely to be unevenly distributed at corners or the like in the display region E1.

Here, the electrode 130 is provided at least between a corner portion of the seal material 40 and a corner portion of the pixel area E where ionic impurities are unevenly distributed. In the present embodiment, the electrode 130 is provided at least between each of two corner portions Ea and Eb of the pixel area E in a diagonal direction and each of two corner portions 40a and 40b of the seal material 40 in the diagonal direction, so as to correspond to obliquely deposited directions (alignment directions of liquid crystal molecules) indicated by the arrows C1 and C2 illustrated in FIG. 2. However, the electrode 130 may have a frame shape provided so as to surround the pixel area E between the pixel area E and the seal material 40. In addition, a plurality of electrodes 130 may be disposed so as to be in parallel, and AC potential may be applied across adjacent electrodes 130. Furthermore, DC potential may be applied to electrodes 130. Furthermore, the electrode 130 may be provided at the second liquid crystal panel 110G and the third liquid crystal panel 110B, in addition to the first liquid crystal panel 110B.

4. Other Embodiments

In the embodiments described above, the first liquid crystal panel corresponding to the first wavelength range is set as the liquid crystal panel 110 corresponding to blue (B). However, the first liquid crystal panel corresponding to the first wavelength range may be set as a liquid crystal panel 110 corresponding to green (G). In this case, light of each wavelength and the liquid crystal panel 110 are defined in the following manner. In this case, the optical sensor device 1 is provided at the liquid crystal panel 110 corresponding to green (G).

Light having a first wavelength range=green (G) light
Light having a second wavelength range=blue (B) light
Light having a third wavelength range=red (R) light
Liquid crystal panel 110 where green (G) light enters=first liquid crystal panel
Liquid crystal panel 110 where blue (B) light enters=second liquid crystal panel
Liquid crystal panel 110 where red (R) light enters=third liquid crystal panel In addition, it may be possible to employ a mode in which the optical sensor device 1 is provided at both of the liquid crystal panel 110 corresponding to blue light and the liquid crystal panel 110 corresponding to green light.

5. Other Electronic Devices

A light emitting element such as an LED or laser diode that outputs individual color light may be used as a light source unit, and the color light output from the light emitting element may be used as light source light. In addition, an electronic device including the liquid crystal panel 110 to which the present disclosure is applied is not limited to the projection-type display device 200, 300 according to the embodiments described above. For example, the liquid crystal panel 110 to which the present disclosure is applied is used as an electronic device such as a projection-type head-up display (HUD), a direct-view type head-mounted display (HMD), a personal computer, a digital still camera, or a liquid crystal TV.

What is claimed is:

1. A display device comprising:
a first liquid crystal panel;
an optical sensor device configured to detect light that is radiated from the first liquid crystal panel when first light having a first wavelength range enters the first liquid crystal panel, the light having a wavelength range longer than the first wavelength range; and
a second liquid crystal panel where second light having a second wavelength range differing from the first wavelength range enters.

2. The display device according to claim 1 comprising:
a third liquid crystal panel where third light having a third wavelength range longer than the first wavelength range and the second wavelength range enters;
a synthesis optical system configured to synthesize the first light having the first wavelength range and modulated by the first liquid crystal panel, the second light having the second wavelength range and modulated by the second liquid crystal panel, and the third light having the third wavelength range and modulated by the third liquid crystal panel, and output the synthesized light; and
a projection optical system configured to project the synthesized light output from the synthesis optical system.

3. The display device according to claim 2, wherein
the first wavelength range is a wavelength range lower than the second wavelength range.

4. The display device according to claim 3, wherein
the light is the light having the third wavelength range.

5. The display device according to claim 4 comprising:
a light shielding member configured to prevent entry, into the optical sensor device, of the third light having the third wavelength range and entering the third liquid crystal panel and prevent entry, into the optical sensor device, of the third light having the third wavelength range and output from the third liquid crystal panel.

6. The display device according to claim 2, wherein
the first liquid crystal panel is a transmissive-type liquid crystal panel, and
the optical sensor device is configured to detect the light output from a surface, at a light incidence side, of the first liquid crystal panel.

7. The display device according to claim 6 comprising:
a dichroic mirror configured to guide, to the first liquid crystal panel, the first light having the first wavelength range of light source light output from a light source, wherein
the optical sensor device is disposed at an opposite side, of the dichroic mirror, from the first liquid crystal panel and is configured to detect the light through the dichroic mirror.

8. The display device according to claim 7 comprising:
a condensing lens disposed between the optical sensor device and the dichroic mirror.

9. The display device according to claim 2, wherein
the first liquid crystal panel is a reflection-type liquid crystal panel, and
the optical sensor device is configured to detect the light output from a surface, at an output side, of the first liquid crystal panel.

10. The display device according to claim 9 comprising:
a polarized beam splitter configured to synthesize an incident-light path for light source light to the first liquid crystal panel and an output optical path for modulated light from the first liquid crystal panel, wherein
the optical sensor device is configured to detect the light through the polarized beam splitter.

11. The display device according to claim 1 comprising:
a determining device configured to determine service life of the first liquid crystal panel on a basis of a result of detection, by the optical sensor device, of an intensity of the light.

12. The display device according to claim 1 comprising:
a determining device configured to determine whether or not an intensity of the light detected by the optical sensor device exceeds a set value, wherein,
when the intensity of the light detected by the optical sensor device exceeds the set value, the determining device makes notification that the intensity of the light detected by the optical sensor device exceeds the set value.

13. The display device according to claim 1, wherein
the first liquid crystal panel includes an electrode used to attract an impurity and configured to draw, toward an outside of a display region, an impurity existing at a liquid crystal layer in the display region, and
the electrode is driven on a basis of a result of detection, by the optical sensor device, of an intensity of the light.

14. The display device according to claim 1, wherein
the optical sensor device detects the light during a period when the first liquid crystal panel performs a display operation.

15. The display device according to claim 1, wherein
the optical sensor device detects the light during a period when the first liquid crystal panel stops a display operation.

16. A method of controlling a display device including a first liquid crystal panel and a second liquid crystal panel, comprising:
causing first light having a first wavelength range to enter the first liquid crystal panel;
causing second light having a second wavelength range differing from the first wavelength range to enter the second liquid crystal panel; and
detecting light that is radiated from the first liquid crystal panel and has a wavelength range longer than the first wavelength range.

* * * * *